United States Patent
Jang (10) Patent No.: US 7,352,767 B2
(45) Date of Patent: Apr. 1, 2008

(54) MULTICARRIER WIRELESS DATA COMMUNICATION METHOD AND APPARATUS, AND TRANSMISSION FRAME FORMAT THEREFOR

(75) Inventor: Kyung-hun Jang, Suwon (KR)

(73) Assignee: Samsung Electronics Co., Ltd., Suwon, Kyungki-do (KR)

( * ) Notice: Subject to any disclaimer, the term of this patent is extended or adjusted under 35 U.S.C. 154(b) by 1064 days.

(21) Appl. No.: 10/234,134

(22) Filed: Sep. 5, 2002

(65) Prior Publication Data
US 2003/0048799 A1 Mar. 13, 2003

(30) Foreign Application Priority Data
Sep. 6, 2001 (KR) ................. 2001-54810

(51) Int. Cl.
*H04L 12/28* (2006.01)
(52) U.S. Cl. ............... 370/431; 370/328; 370/343; 455/450; 455/561
(58) Field of Classification Search ........... 370/431, 370/422, 470, 299, 414, 418, 508, 252, 333, 370/328, 342, 343, 345, 208; 455/63, 464, 455/500, 509, 524, 450, 561
See application file for complete search history.

(56) References Cited

U.S. PATENT DOCUMENTS

| | | | | |
|---|---|---|---|---|
| 5,726,978 A | * | 3/1998 | Frodigh et al. | 370/252 |
| 6,081,721 A | * | 6/2000 | Suzuki et al. | 455/450 |
| 6,192,026 B1 | | 2/2001 | Pollack et al. | |
| 6,201,811 B1 | * | 3/2001 | Larsson et al. | 370/310.1 |
| 6,381,228 B1 | * | 4/2002 | Prieto, Jr. et al. | 370/323 |
| 6,947,748 B2 | * | 9/2005 | Li et al. | 455/450 |

FOREIGN PATENT DOCUMENTS

| | | |
|---|---|---|
| EP | 1 109 356 | 6/2001 |
| EP | 1 109 356 A2 | 6/2001 |
| EP | 1 109 356 A3 | 6/2001 |

(Continued)

OTHER PUBLICATIONS

Jang et al. (IEEE 802.16 Broadband Wireless Access Working Group, XP002221430, Jul. 2001.*

(Continued)

*Primary Examiner*—Ricky Q. Ngo
*Assistant Examiner*—Kibrom T Hailu
(74) *Attorney, Agent, or Firm*—Lee & Morse, P.C.

(57) ABSTRACT

Provided are a wireless data communication apparatus and a method using a multicarrier, and a transmission frame format therefore, wherein through the wireless data communication method, a plurality of stations can transmit and receive burst data to and from a net access group switching center wirelessly using a multicarrier. The method includes: (a) allocating a sub-carrier channel set to one of the plurality of stations that requests allocation of the sub-carrier channel set consisting of sub-carriers of a first predetermined number out of a plurality of sub-carriers at a predetermined point of time; (b) activating the sub-carrier channel set allocated to the station which desires to transmit the data; and (c) checking the activation of the sub-carrier channel set, detecting a station that requests the allocation of resources based on the checked results, and allocating resources of a second predetermined number to the detected station.

25 Claims, 4 Drawing Sheets

FOREIGN PATENT DOCUMENTS

| | | |
|---|---|---|
| JP | 11-027231 | 1/1999 |
| JP | 2001-211189 | 8/2001 |

OTHER PUBLICATIONS

Le (A MAC Protocol for Asymmetric Multimedia Traffic with Prioritized Services in Local Wirelesss ATM Network, 1999 IEEE.*

Jang et al, Fast Acknowledgement Method Using Subcarrier Set, IEEE 802.16abc-01/10, pp. 1-5, Jul. 2001.

Kaitz et al, Subcarrier Based Polling for OFDM, IEEE 802.16abp-01/30—XP002221431, Sep. 2001.

Andrew S. Tanenbaum, Computer Networks, pp. 121-124 & 128-140, 1989.

* cited by examiner

MULTICARRIER WIRELESS DATA COMMUNICATION METHOD AND APPARATUS, AND TRANSMISSION FRAME FORMAT THEREFOR

BACKGROUND OF THE INVENTION

1. Field of the Invention

The present invention relates to wireless data communication. More particularly, the present invention relates to a wireless data communication apparatus and method using a multicarrier and to a transmission frame format therefor.

2. Description of the Related Art

In wireless data communication using burst data, the efficient use of system resources often requires that resources be allotted and retrieved dynamically. In a conventional centralized wireless data system, transmission frames are usually classified by the broadcast period, the downlink period, the uplink period, and the contention period. In such a system, information regarding how to manage the downlink period, uplink period and contention period is contained in the broadcast period. In general, in a centralized wireless data system, each station requests the allocation of resources from a net access group switching center through a contention method or a piggyback method. In the former case, stations transmit a message requesting the allocation of resources to the net access group switching center during the same contention period. Such a process suggests that there is a high probability that several stations request the allocation of resources at the same time, which would cause contention in the request for the allocation of resources. In the latter case, a station that desires to transmit data requests the allocation of resources in a next transmission frame using a specific head field included in the resources it has already been allocated. Thus, there is less contention in the request for the allocation of resources in the piggyback method than in the contention method.

In a station that desires to transmit burst data to a net access group switching center, the request of resources through a contention method takes place at the start of the data burst transmission. The request through a piggyback method, on the other hand, is performed continuously during the transmission. Even though contention may be minimized in many ways, there still are numerous obstacles in enhancing the quality of various data services, such as real-time data services, when requesting resources using the contention method.

To solve this problem, contention resolution methods such as slotted-aloha methods are adopted. According to the slotted-aloha method, each station, which is to request resources in a contention period having M time slots, generates random values from 1 to M-1 and delays a time slot to correspond to the generated value, thereby minimizing the occurrence probability of the contention in the request for resources. In the slotted-aloha method, the occurrence probability of the contention can be reduced by increasing the length of the contention period, but this poses more difficulties in the effective use of resources.

According to a method of solving the problem of the slotted-aloha method, resources are requested by allocating one sub-carrier for each station and polling a sub-carrier allocated in a predetermined period. In this method, the sub-carrier allocated for each frame is hopped to overcome multi-path fading. However, in the event that a specific sub-carrier is lost due to the multi-path fading, resources must be requested in a next frame, and therefore, this method is not adequate for the request for resources at high speed.

SUMMARY OF THE INVENTION

In an effort to solve the above-described problems, it is a first feature of an embodiment of the present invention to provide a wireless data communication method using a multicarrier, in which the contention in the request for resources and a loss of a resource request signal are prevented, and resources may be effectively used.

It is a second feature of an embodiment of the present invention to provide a wireless data communication apparatus for performing such a wireless data communication method using a multicarrier.

It is a third feature of an embodiment of the present invention to provide a transmission frame format used in such wireless data communication method and apparatus.

To provide the first feature of an embodiment of the present invention, there is provided a wireless data communication method by which a plurality of stations can transmit and receive burst data to and from a net access group switching center wirelessly using a multicarrier, the method including: (a) allocating a sub-carrier channel set to one of the plurality of stations that requests allocation of the sub-carrier channel set consisting of sub-carriers of a first predetermined number out of a plurality of sub-carriers at a predetermined point of time; (b) activating the sub-carrier channel set allocated to the station which desires to transmit the data; and (c) checking the activation of the sub-carrier channel set, detecting a station that requests the allocation of resources based on the checked results, and allocating resources of a second predetermined number to the detected station.

To provide the second feature of an embodiment of the present invention, there is provided a transmission frame format that includes burst data and is transmitted between a net access group switching center and a plurality of stations for a wireless data communication method using a multicarrier, the transmission frame format including a contention period containing information regarding a request for allocation of a sub-carrier channel set and a receipt of the sub-carrier channel set; a bandwidth request period containing the sub-carrier channel set; a downlink period containing data to be transmitted from the net access group switching center to one of the plurality of stations; an uplink period containing resources to be allocated to one of the plurality of stations; and a broadcast period containing information regarding beginning points and lengths of the contention period, the bandwidth request period, the downlink period and the uplink period.

To provide the third feature of an embodiment of the present invention, there is provided a wireless data communication apparatus through which burst data is received and transmitted wirelessly using a multicarrier including a net access group switching center, and a plurality of stations, wherein each one of the plurality of stations transmits information requesting the allocation of a sub-carrier channel set, which consists of sub-carriers of a first predetermined number out of a plurality of sub-carriers which exist at a predetermined time, to the net access group switching center, and activates the sub-carrier channel set allocated to a corresponding one of the plurality of stations so as to transmit the data; and wherein the net access group switching center allocates the sub-carrier channel set to the corresponding one of the plurality of stations in response to the information transmitted from the one of the plurality of stations, checks the activation of the sub-carrier channel set and detects a station desiring the allocation of resources based on the checked result, and allocates resources of a second predetermined number to the detected station.

BRIEF DESCRIPTION OF THE DRAWINGS

The above features and advantages of the present invention will become more apparent to those of ordinary skill in the art by describing in detail preferred embodiments thereof with reference to the attached drawings in which.

DETAILED DESCRIPTION OF THE INVENTION

Korean Patent Application No. 2001-54810, filed Sep. 6, 2001, and entitled: "Multicarrier Wireless Data Communication Method and Apparatus, and Transmission Frame Format Therefor," is incorporated by reference herein in its entirety.

The structure and operation of a wireless data communication apparatus using a multicarrier mode, and a wireless data communication method performed by the wireless data communication apparatus, according to the present invention, will now be described referring to the accompanying drawings.

Figure 1:
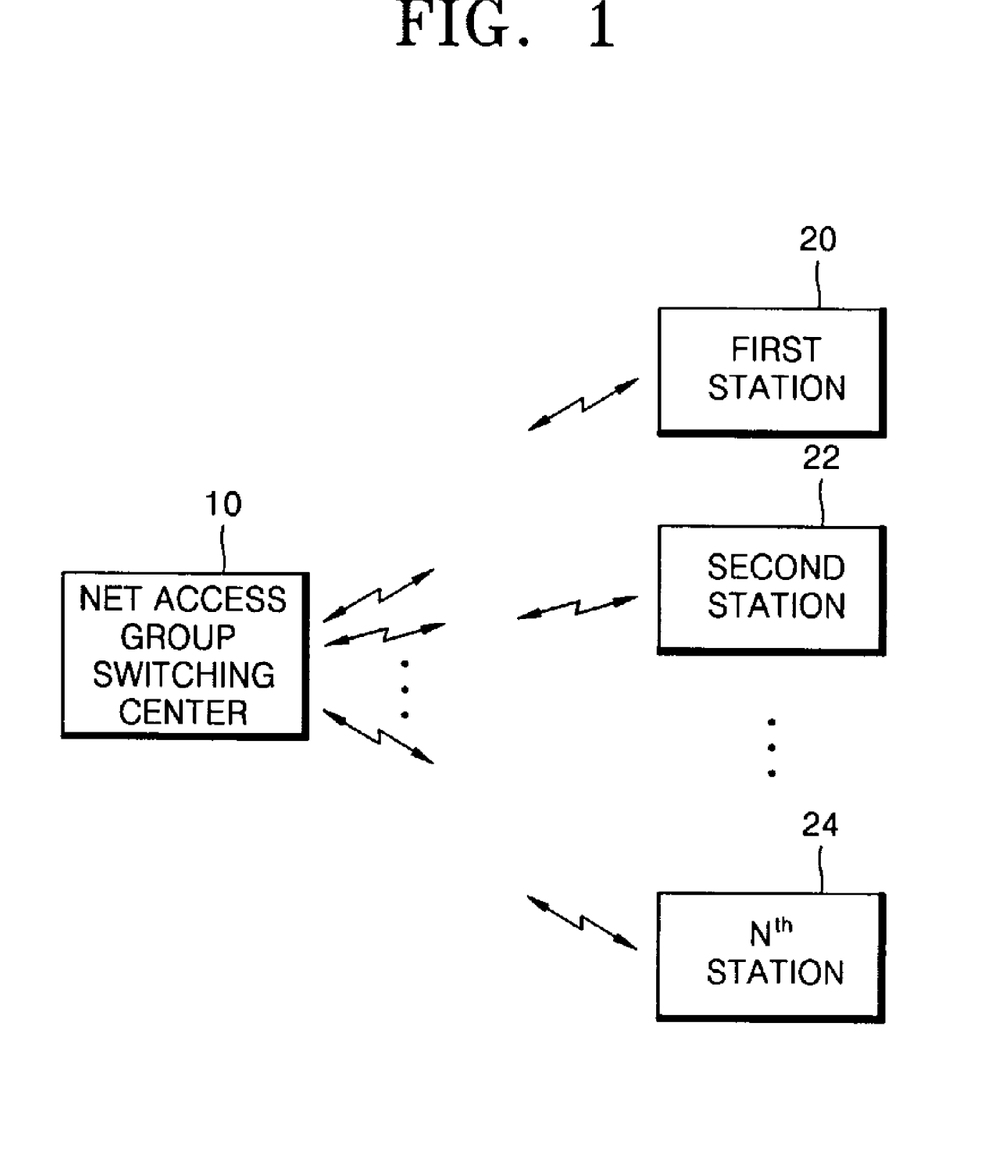
FIG. 1 is a block diagram of the structure of a wireless data communication apparatus using a multicarrier mode according to an embodiment of the present invention.

FIG. 1 is a block diagram of the structure of a wireless data communication apparatus using a multicarrier mode, according to an embodiment of the present invention. The wireless data communication apparatus includes a net access group switching center 10 and a plurality of stations, i.e., a first, second, . . . , and $N^{th}$ stations 20, 22, . . . , and 24.

Figure 2:
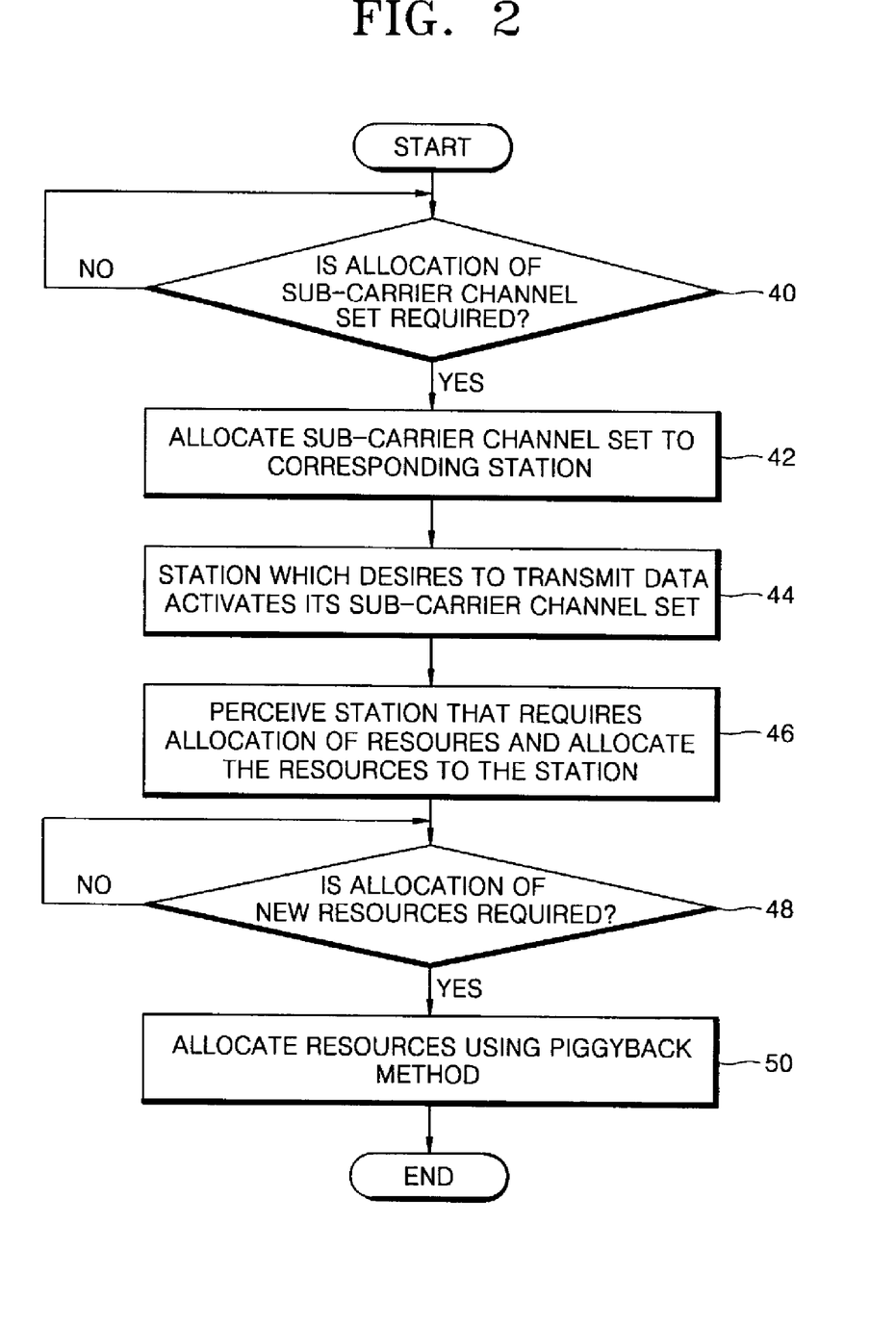
FIG. 2 is a flow chart for explaining a wireless data communication method, according to an embodiment of the present invention, performed by the wireless data communication apparatus of FIG. 1.

FIG. 2 is a flow chart for explaining a wireless data communication method performed by the wireless data communication apparatus of FIG. 1. This method includes allocating a sub-carrier channel set to a corresponding station (steps 40 and 42), allocating resources to a station corresponding to an activated sub-carrier channel set (steps 44 and 46), and allocating new resources by a piggyback method (steps 48 and 50).

Referring to FIGS. 1 and 2, in a wireless data communication method using a multicarrier mode according to the present invention, the first, second, . . . , and $N^{th}$ stations 20, 22, . . . , and 24 transmit and receive burst data to and from the net access group switching center 10 wirelessly, using a multicarrier mode. Here, the multicarrier mode refers to a mode in which one carrier is divided into several sub-carriers before being used. For example, the multicarrier mode can be orthogonal frequency division multiplexing access (OFDMA)/time division multiplexing access (TDMA); orthogonal frequency division multiplexing (OFDM)/code division multiplexing access (CDMA); OFDMA/CDMA; or OFDM/TDMA.

First, in steps 40 and 42, the net access group switching center 10 allocates a sub-carrier channel set to a station 20, 22, or 24, which requests allocation of the sub-carrier channel set consisting of a first predetermined number of sub-carriers among the plurality of sub-carriers which exist at a predetermined time. In detail, in step 40, the net access group switching center 10 checks whether there is a station requesting the allocation of the sub-carrier channel set. For this, each station 20, 22, . . . , or 24 transmits information requesting the allocation to the net access group switching center 10 when desiring the allocation of the sub-carrier channel set. Then, the net access group switching center 10 detects the station transmitting the information.

If the net access group switching center 10 receives the information from one of the stations 20, 22, . . . , and 24 and perceives from the information that the station 20, 22, . . . , or 24, which gives the information, requests the allocation of the sub-carrier channel set, in step 42, the net access group switching center 10 allocates the sub-carrier channel set to the station. Here, the first predetermined number is determined according to the coarse extent of the communication conditions. That is, the first predetermined number is a large number when the communication conditions are poor, and is a small number when the communication conditions are good. In addition, according to the present invention, the sub-carrier channel set consists of sub-carriers having less interference between them, i.e., sub-carriers that are not adjacent to one another.

As a result, the first, second, . . . and $N^{th}$ stations 20, 22, . . . and 24 are allocated their inherent sub-carrier channel sets from the net access group switching center 10, as described above. Sub-carriers, which constitute the sub-carrier channel sets which are allocated to the first, second, . . . , and $N^{th}$ stations 20, 22, . . . and 24, are different from one another, which will be later explained in detail.

After step 42, in step 44, one of the first, second, . . . , and $N^{th}$ stations 20, 22, . . . , and 24, which is to transmit data, activates the sub-carrier channel set allocated to that station. For the activation of an allocated sub-carrier channel set, each station 20, 22, . . . , or 24 can raise the amplitude of each of the sub-carriers included in the sub-carrier channel set.

After step 44, in step 46, the net access group switching center 10 checks whether the sub-carrier channel sets are activated, perceives a station requiring the allocation of resources based on the perceived result, and allocates a second predetermined number of resources to the perceived station. Here, the resources allocated to the perceived station may be a time slot, or the time slot as well as a frequency band of a sub-carrier according to the type of a multicarrier mode adopted. For instance, resources are time slots when the multicarrier mode is OFDMA/TDMA or OFDM/TDMA, and resources are time slots and the frequency band of a sub-carrier when the multicarrier mode is OFDM/CDMA or OFDMA/CDMA.

Hereinafter, a preferred embodiment of step 46 illustrated in FIG. 2 will be described with reference to the accompanying drawings.

Figure 3:
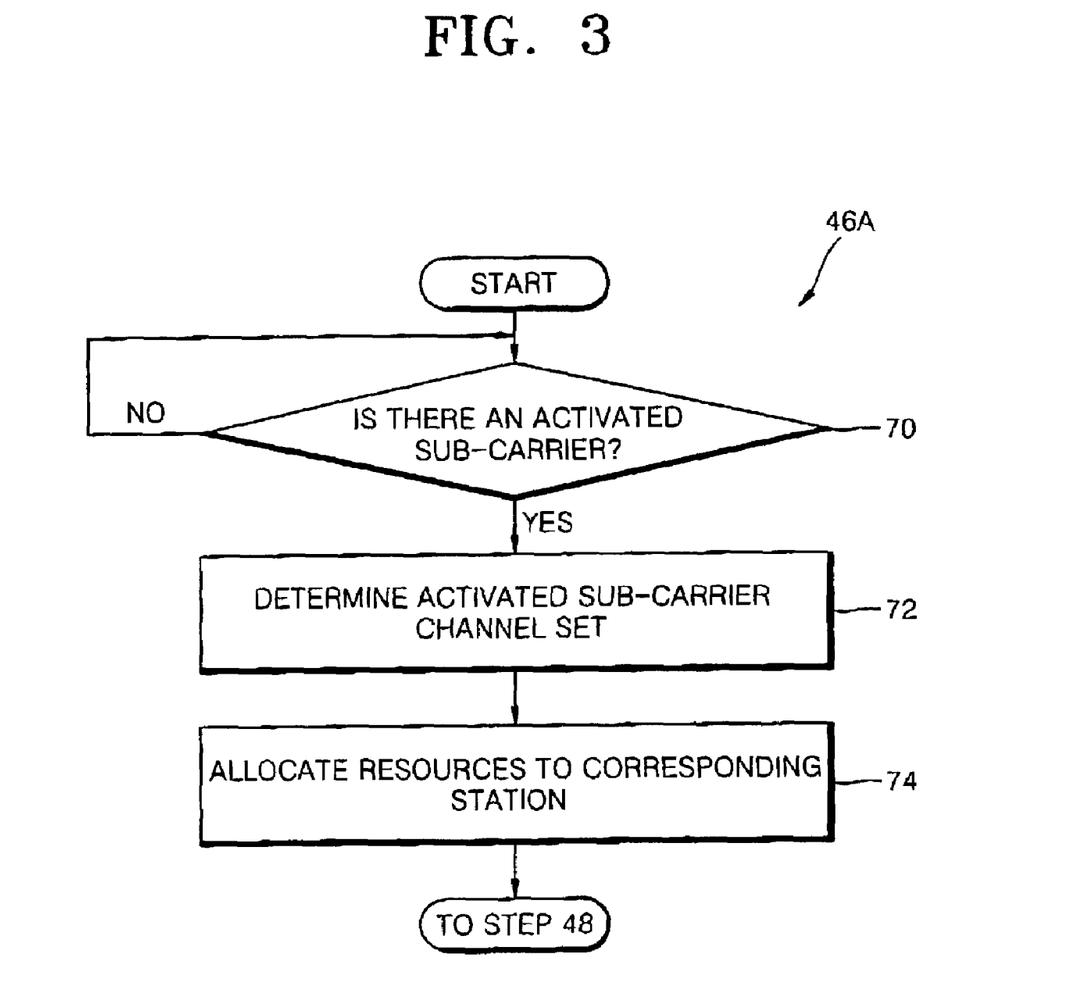
FIG. 3 is a flow chart for explaining a preferred embodiment of step 46 illustrated in FIG. 2.

FIG. 3 is a flow chart for explaining the preferred embodiment 46A of step 46 illustrated in FIG. 2. The embodiment 46A includes steps 70 through 74 of allocating resources to activated sub-carrier channel set.

In detail, as shown in FIG. 3, after performing step 44 of FIG. 2, in step 70, the net access group switching center 10 checks for the presence of an activated sub-carrier by verifying if the amplitude of the sub-carrier is above a critical value.

If it is determined in step 70 that there is an activated sub-carrier, in step 72, the net access group switching center 10 determines a sub-carrier channel set including the activated sub-carrier as an activated sub-carrier channel set. In other words, the net access group switching center 10 inspects to which sub-carrier channel set the activated sub-carrier belongs out of the sub-carrier channel sets, and determines the inspected sub-carrier channel set as an activated sub-carrier channel set.

At this time, according to the present invention, even if the amplitude of other sub-carriers, except for the activated sub-carrier, which are included in the sub-carrier channel set having the activated sub-carrier, is not above the critical value, the net access group switching center 10 determines as the activated sub-carrier channel set the sub-carrier channel set which includes at least one activated sub-carrier. This is because there is a probability that at least one sub-carrier included in the sub-carrier channel set is lost during the wireless transmission to the net access group switching center 10 from a corresponding station 20, 22, ..., or 24. Therefore, even if sub-carriers of the sub-carrier channel set are partially activated due to the multi-path fading, the resources can be allocated to a corresponding station to which the sub-carrier channel set is allocated. In conclusion, according to the present invention, if it is determined that the amplitude of at least one sub-carrier which belongs to the sub-carrier channel set, is above the critical value, the sub-carrier channel set can be determined as an activated sub-carrier channel set in step 72

After step 72, in step 74, the net access group switching center 10 allocates resources of a second predetermined number to the stations to which the activated sub-carrier channel set were allocated in step 42, and then performs step 48. Here, the second predetermined number may be reported to the net access group switching center 10 by the first, second, ..., or $N^{th}$ station 20, 22, ..., or 24 when the station 20, 22, ..., or 24 requests the net access group switching center 10 to allocate a sub-carrier channel set. In the event that the second predetermined number is not reported to the net access group switching center 10, the net access group switching center 10 may determine the second predetermined number as '1', and then allocate one resource to a corresponding station.

Meanwhile, in step 48, the net access group switching center 10 determines if a first, second, ..., or $N^{th}$ station 20, 22, ..., or 24 to which the resources were allocated in step 46 requests the allocation of new resources of a third predetermined number. If it is determined in step 48 that the station to which the resources were allocated in step 46 desires the allocation of the new resources of the third predetermined number, in step 50, the net access group switching center 10 allocates the resources of the third predetermined number to the station. Here, steps 48 and 50 are performed by the aforementioned piggyback method.

Hereinafter, in a wireless data communication apparatus and a method according to an embodiment of the present invention, the structure of the format according to the present invention of a transmission frame that includes burst data and is transmitted between the net access group switching center 10 and the first, second, ..., and $N^{th}$ stations 20, 22, ..., and 24, will be described with reference to the accompanying drawings.

Figure 4:
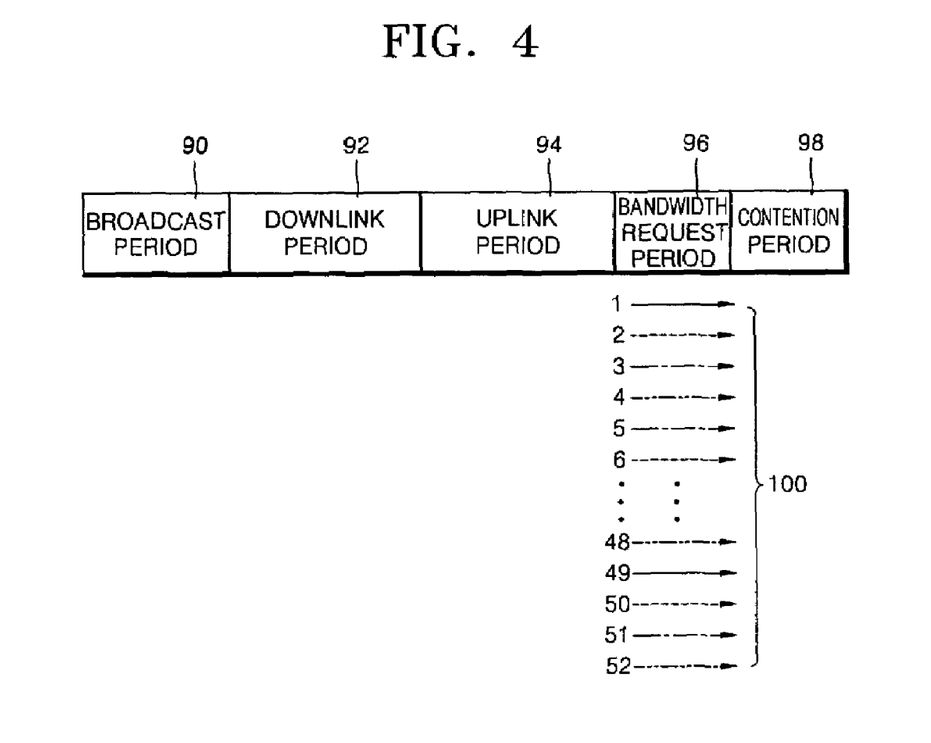
FIG. 4 illustrates a structure of a unit transmission frame format according to an embodiment of the present invention.

FIG. 4 illustrates a structure of the format of a unit transmission frame according to an embodiment of the present invention. The unit transmission frame includes a broadcast period 90, a downlink period 92, an uplink period 94, a bandwidth request period 96, and a contention period 98.

The unit transmission frame of FIG. 4 can be transmitted from the net access group switching center 10 to the first, second, ..., and $N^{th}$ stations 20, 22, ..., and 24, or transmitted from the first, second, ..., and $N^{th}$ stations 20, 22, ..., and 24 to the net access group switching center 10. The contention period 98 is used when allocation request information regarding the request of the allocation of a sub-carrier channel set is transmitted to the net access group switching center 10 at an initial time, that is, at a time when the first, second, ..., or $N^{th}$ station 20, 22, ..., or 24 begins to transmit burst data. The contention period 98 is also used when a station to which a sub-carrier channel set is allocated sends the net access group switching center 10 allocation receipt information notifying that the sub-carrier channel set is allocated by the net access group switching center 10. Therefore, the net access group switching center 10 can check if the first, second, ..., or $N^{th}$ station 20, 22, ..., or 24 requests the allocation of the sub-carrier channel set, or the station properly receives an allocated sub-carrier channel set, referring to the allocation request information and the allocation receipt information stored in the contention period 98 of the transmission frame of FIG. 4. Additionally, the first, second, ..., or $N^{th}$ station 20, 22, ..., or 24 includes a second predetermined number in the contention period 98 and notifies the contention period 98 to the net access group switching center 10.

The bandwidth request period 96 contains sub-carrier channel sets to be allocated to the first, second, ..., and $N^{th}$ stations 20, 22, ..., and 24 by the net access group switching center 10. At this time, the bandwidth request period 96 occupies only a unit time slot. In this case, one carrier includes 52 sub-carriers in a wireless personal area network (WLAN), and one carrier includes 512 or 1024 sub-carriers in broadband wireless access (BWA).

To facilitate explanation of the present invention, it is assumed that one carrier includes an exemplary fifty-two sub-carriers 100 as shown in FIG. 4 and a first determined number is '3'.

If it is determined that the first, second, ..., or $N^{th}$ station 20, 22, ..., or 24 requests the net access group switching center 10 to allocate it a sub-carrier channel set, the net access group switching center 10 may, in step 42, allocate a sub-carrier channel set {3, 5, 51} consisting of the third, fifth and fifty-first sub-carriers, which are each indicated by a one-dot dash line in FIG. 4, to the first station 20; allocate a sub-carrier channel set {4, 48, 52} consisting of the fourth, forty-eighth and fifty-second sub-carriers, which are each indicated by a two-dot dash line, to the second station 22; and allocate a sub-carrier channel set {2, 6, 50} consisting of the second, sixth and fiftieth sub-carriers, which are each indicated by a dotted line, to the $N^{th}$ station 24. In other words, in the sub-carriers 100 of FIG. 4, the third, fifth and fifty-first sub-carriers are elements of the sub-carrier channel set allocated to the first station 20; the fourth, forty-eighth, and fifty-second sub-carriers are elements of the sub-carrier channel set allocated to the second station 22; and the second, sixth, and fiftieth sub-carriers are elements of the sub-carrier channel set allocated to the $N^{th}$ station 24. Therefore, each station has sub-carriers of a different frequency band. At this time, the net access group switching center 10 constitutes each sub-carrier channel set with non-adjacent sub-carriers so as to minimize interference between sub-carriers.

In step 44, one of the stations 20, 22, ..., and 24, which has data to be transmitted to the net access group switching center 10, activates sub-carriers in a sub-carrier channel set allocated to that station. At the initial time, the first, second, and $N^{th}$ stations 20, 22 and 24 may determine a second predetermined number m(i) to be 1, 3, and 2, respectively.

Here, i denotes the identification number of each station, i.e., i=1, 2, . . . , or N. That is, if m(1)=1, m(2)=3, and m(3)=2, and m(1), m(2), and m(3) are transmitted to the net access group switching center 10, in step 46, the net access group switching center 10 allocates one, three, or two resources to the activated first, second, or $N^{th}$ station 20, 22 or 24, respectively. For instance, when the first station 20 has data to be transmitted to the net access group switching center 10, in step 44, it activates the third, fifth and fifty-first sub-carriers in the bandwidth request period 96. Then, the net access group switching center 10 checks the amplitude of the sub-carriers 100 in the bandwidth request period 96. As a result, when at least one of the third, fifth and fifty-first sub-carriers is considered as being activated, the net access group switching center 10 allocates one resource to the first station 20.

In conclusion, in a wireless data communication according to the present invention, the net access group switching center 10, after step 42, may make and preserve Table 1 illustrated below. Thus, the net access group switching center 10 can determine an activated sub-carrier channel set and allocate resources of a second predetermined number to a station to which the determined sub-carrier channel set is allocated, referring to the preserved table whenever an activated sub-carrier exists.

TABLE 1

| s(i) | {3, 5, 51} | {4, 48, 52} | . . . | {2, 6, 50} |
|---|---|---|---|---|
| i | 1 | 2 | . . . | N |
| m(i) | 1 | 3 | . . . | 2 | wherein s(i) indicates a sub-carrier channel set.

Meanwhile, the downlink period 92 is a period containing data to be transmitted to the first, second, . . . , and $N^{th}$ stations 20, 22, . . . , and 24 from the net access group switching center 10, whereas the uplink period 94 is a period containing resources to be allocated to the first, second, . . . , and $N^{th}$ stations 20, 22, . . . , and 24.

Figure 5:
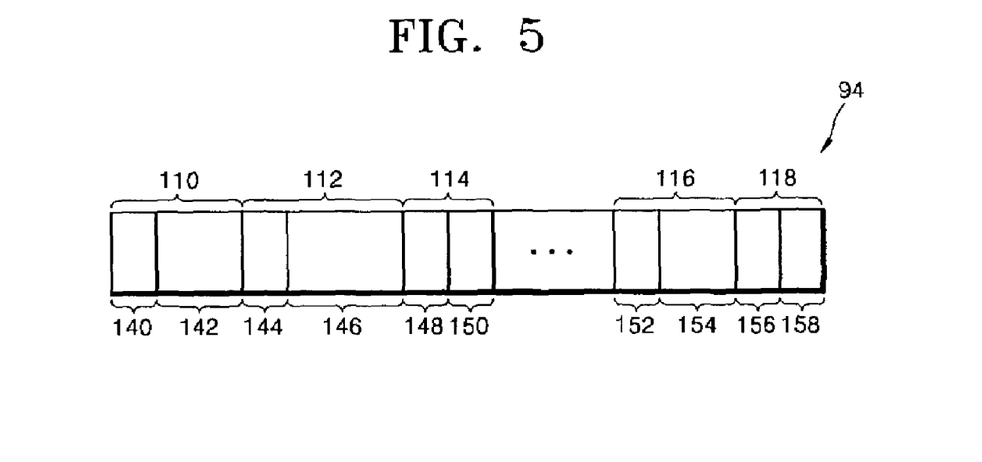
FIG. 5 illustrates a structure of an uplink period illustrated in FIG. 4.

FIG. 5 illustrates the structure of the uplink period 94 of FIG. 4. The uplink period 94 consists of N sources 110, 112, 114, . . . , 116, and 118.

The N resources 110, 112, 114, . . . , 116, and 118 illustrated in FIG. 5 are to be allocated to the first, second, . . . , and $N^{th}$ stations 20, 22, . . . , and 24, respectively. Here, the resources 110, 112, 114, . . . , 116, and 118 include the headers 140, 144, 148, . . . , 152, and 156, respectively, and the payloads 142, 146, 150, . . . , 154, and 158, respectively. The header 140, 144, 148, . . . , 152, or 156 has the third predetermined number and the payload 142, 146, 150, . . . , 154, or 158 hold data. Therefore, when a station to which resources are allocated in step 46 desires to receive new resources of the third predetermined number, the station includes the third predetermined number in the header of the resources allocated in step 46, and transmits the same to the net access group switching center 10. Then, the net access group switching center 10 can allocate resources of the third predetermined numbers, which the header 140, 144, 148, . . . , 152 or 156 of the resource 110, 112, 114, . . . , 116 or 118 in the uplink period 94 indicates to the station requiring the allocation of new resources in the piggyback method in step 50. In the uplink period 94 of FIG. 5, even if the lengths of the resources 110, 112, 114, . . . , 116, and 118 are different from one another, the lengths of the headers 140, 144, 148, . . . , 152, and 156 are the same. However, in this case, the lengths of the payloads 142, 146, 150, . . . ,154 and 158 are different from one another.

The broadcast period 50 contains information regarding the beginning points and lengths of the downlink period 92, the uplink period 94, the bandwidth request period 96, and the contention period 98. The broadcast period 50 also contains information required to control or manage the periods 92, 94, 96 and 98, such as synchronization information for adjusting the time information between the net access group switching center 10 and the stations 20, 22, . . . , N.

As described above, in a wireless data communication method and apparatus using a multicarrier, and a transmission frame format therefor, according to the present invention, a station requests a net access group switching center to allocate it resources using a sub-carrier channel set for the transmission of data, and not through a conventional contention method. Thus, it is possible to prevent the contention of a plurality of stations 20, 22, and 24 for the request of data transmission to the net access group switching center 10. Additionally, the station requests resources to the net access group switching center by activating a sub-carrier channel set including a plurality of sub-carriers as compared to the prior art requesting resources by activating only one sub-carrier. Therefore, it is possible to minimize loss in a resource request signal, i.e. a sub-carrier, due to multi-path fading, thereby enabling a stable request for resources. Further, the length of a contention period, which is required at a beginning instant of time when the station makes a request for resources, can be shortened more than the length of a contention period in the prior art, thereby maximizing the efficiency of the use of resources.

Preferred embodiments of the present invention have been disclosed herein and, although specific terms are employed, they are used and are to be interpreted in a generic and descriptive sense only and not for purpose of limitation. Accordingly, it will be understood by those of ordinary skill in the art that various changes in form and details may be made without departing from the spirit and scope of the present invention as set forth in the following claims.

What is claimed is:

1. A wireless data communication method by which a plurality of stations can transmit and receive burst data to and from a net access group switching center wirelessly using a multicarrier, the method comprising:
   (a) allocating a sub-carrier channel set to each of the plurality of stations that requests allocation of the sub-carrier channel set consisting of sub-carriers of a first predetermined number out of a plurality of sub-carriers at a predetermined point of time;
   (b) activating the sub-carrier channel set allocated to each of the stations desiring to transmit data; and
   (c) checking for activation of at least one of the sub-carrier channel sets by determining if at least one sub-carrier in the allocated sub-carrier channel set is varied and, based on the checked activation results, allocating resources of a second predetermined number to the stations having an activated sub-carrier channel set allocated thereto.

2. The method as claimed in claim 1, wherein (c) comprises:
   checking for the presence of at least one activated sub-carrier;
   determining which of the allocated sub-carrier channel sets is an activated sub-carrier channel set that includes at least one activated sub-carrier when it is determined that the activated sub-carrier is present; and for each of the activated sub-carrier channel sets, allocating the resources of the second predetermined number to the respective station to which the activated sub-carrier channel set is allocated.

3. The method as claimed in claim 1, wherein during (a), the second predetermined number is reported to the net access group switching center for requesting the allocation of the sub-carrier channel set.

4. The method as claimed in claim 1 further comprising after (c), allocating resources of a third predetermined number in a piggyback method to a station to which the resources are allocated and which requires allocation of new resources of the third predetermined number.

5. The method as claimed in claim 1, wherein the resources are time slots.

6. The method as claimed in claim 1, wherein the resources are time slots and a frequency band of the sub-carrier.

7. The method as claimed in claim 1, wherein the first predetermined number is determined according to communication conditions.

8. The method as claimed in claim 1, wherein the sub-carrier channel set comprises non-adjacent sub-carriers having minimal interference therebetween.

9. The method as claimed in claim 1, wherein the method uses a the transmission frame format comprising:
   a contention period containing information regarding the request for allocation of the sub-carrier channel set and the receipt of the sub-carrier channel set;
   a bandwidth request period containing the sub-carrier channel set;
   a downlink period containing data to be transmitted from the net access group switching center to one of the plurality of stations;
   an uplink period containing resources to be allocated to one of the plurality of stations; and
   a broadcast period containing information regarding beginning points and lengths of the contention period, the bandwidth request period, the downlink period and the uplink period.

10. The transmission frame format of claim 9, wherein the contention period has the second predetermined number to be reported to the net access group switching center.

11. The transmission frame format as claimed in claim 9, wherein each of the resources contained in the uplink period comprises:
   a header of a third predetermined number; and
   payloads having data.

12. A wireless data communication apparatus through which burst data is received and transmitted wirelessly using a multicarrier, comprising:
   a net access group switching center; and
   a plurality of stations, wherein each one of the plurality of stations transmits information requesting the allocation of a sub-carrier channel set, which consists of sub-carriers of a first predetermined number out of a plurality of sub-carriers which exist at a predetermined time, to the net access group switching center, and activates the sub-carrier channel set allocated to a corresponding one of the plurality of stations so as to transmit data; and
   wherein the net access group switching center allocates the sub-carrier channel set to the corresponding one of the plurality of stations in response to the information transmitted from the one of the plurality of stations, checks the activation of the sub-carrier channel set by determining if at least one sub-carrier in the allocated sub-carrier channel set is varied and, based on the checked activation result, allocates resources of a second predetermined number to the station to which the activated sub-carrier channel set is allocated.

13. The wireless data communication apparatus as claimed in claim 12, wherein the net access group switching center further determines which of the allocated sub-carrier channel sets is an activated sub-carrier channel set that includes at least one activated sub-carrier, and, for each of the activated sub-carrier channel sets, allocates the resources of the second predetermined number to the corresponding station to which the activated sub-carrier channel set is allocated.

14. The wireless data communication apparatus as claimed in claim 12, wherein the access group switching center further allocates resources of a third predetermined number in a piggyback method to a station to which the resources are allocated and requires allocation of new resources of the third predetermined number.

15. The wireless data communication apparatus as claimed in claim 12, wherein the resources are time slots.

16. The wireless data communication apparatus as claimed in claim 12, wherein the resources are time slots and a frequency band of the sub-carrier.

17. The wireless data communication apparatus as claimed in claim 12, wherein the first predetermined number is determined according to quality of communication conditions.

18. The wireless data communication apparatus as claimed in claim 12, wherein the sub-carrier channel set comprises non-adjacent sub-carries interference therebetween.

19. The wireless data communication method as claimed in claim 1, wherein the resources of the second predetermined number are only allocated to each the sub-carrier channel sets including at least one of sub-carrier channel having an amplitude above the critical value.

20. The wireless data communication method as claimed in claim 1, wherein the activation of the sub-carrier channel set is determined if an amplitude of at least one sub-carrier in the allocated sub-carrier channel set is above a critical value.

21. The wireless data communication system as claimed in claim 12, wherein the activation of the sub-carrier channel set is determined if an amplitude of at least one sub-carrier in the allocated sub-carrier channel set is above a critical value.

22. A station that transmits and receives burst data to and from a net access group switching center wirelessly using a multicarrier, wherein the station transmits information requesting the allocation of a sub-carrier channel set, which consists of sub-carrier of a first predetermined number out of a plurality of sub-carriers that exist at a predetermined time, to the net access group switching center, and activates the sub-carrier channel set allocated by the net access group switching center so as to transmit data, by varying at least one sub-carrier in the allocated sub-carrier channel.

23. The station as claimed in claim 22, wherein the sub-carrier channel set is activated by setting an amplitude of at least one sub-carrier in the allocated sub-carrier channel set above a critical value.

24. A net access group switching center that transmits and receives burst data to and from a plurality of stations wirelessly using a multicarrier, wherein the net access group switching center allocates a sub-carrier channel set to each of the plurality of stations that requests allocation of the sub-carrier channel set consisting of sub-carriers of a first predetermined number out of a plurality of sub-carriers at a predetermined point of time, checks for activation of at least one of the sub-carrier channel sets by determining if at least one sub-carrier in the allocated sub-carrier channel set is varied, and allocates resources of a second predetermined number to the stations having an activated sub-carrier channel set allocated thereto, based on the checked results.

25. The net access group switching center as claimed in claim 24, wherein the activation of the sub-carrier channel set is determined if an amplitude of at least one sub-carrier in the allocated sub-carrier channel set is above a critical value.

* * * * *